United States Patent [19]
Tseytlin et al.

[11] Patent Number: 6,089,245
[45] Date of Patent: Jul. 18, 2000

[54] COLLAPSIBLE SUNSHADE WITH HINGED ARMS

[76] Inventors: Alexander A. Tseytlin, 2821 La Jolla Ave., San Jose, Calif. 95124; Julia A. Brisker, 4320 Sayoko Circuit, San Jose, Calif. 95136

[21] Appl. No.: 09/173,820

[22] Filed: Oct. 16, 1998

[51] Int. Cl.[7] .............................. E04H 15/08; B60J 3/02
[52] U.S. Cl. ............................ 135/88.01; 135/88.09; 135/90; 135/117; 135/147; 296/97.7; 160/370.21
[58] Field of Search ........................ 135/88.1, 88.09, 135/90, 115, 117, 20.1, 135, 147; 296/97.1, 97.6, 97.7, 97.8; 160/53, 84.07, 134, 370.21, 370.23

[56] References Cited

U.S. PATENT DOCUMENTS

| | | | |
|---|---|---|---|
| 706,605 | 8/1902 | Slyder | 135/20.1 X |
| 2,736,375 | 2/1956 | Rupert | 160/84.1 X |
| 2,764,993 | 10/1956 | Wallace et al. | 135/20.1 X |
| 2,897,002 | 7/1959 | Yovich | 135/90 X |
| 3,156,497 | 11/1964 | Lessard | 135/90 X |
| 4,458,707 | 7/1984 | Lindaman | 135/16 X |
| 4,606,572 | 8/1986 | Maguire . | |
| 4,624,275 | 11/1986 | Baldwin | 135/20.1 |
| 5,355,903 | 10/1994 | Haddad et al. | 135/20.1 |
| 5,738,129 | 4/1998 | Vogt | 135/20.1 X |

FOREIGN PATENT DOCUMENTS

| | | | |
|---|---|---|---|
| 2237193 | 5/1991 | United Kingdom | 135/20.1 |

OTHER PUBLICATIONS

Product packaging of "Brella–Shade" by Quantum Auto, Inc. 2 sheets.

*Primary Examiner*—Carl D. Friedman
*Assistant Examiner*—Winnie Yip
*Attorney, Agent, or Firm*—Jack Lo

[57] ABSTRACT

A sunshade includes a flexible sheet with a hub generally positioned at its center. A plurality of radial arms are hinged to the hub about parallel axes which are perpendicular to the sheet. The outer ends of the arms are secured to the corners of the sheet. The sunshade is folded by pivoting the arms toward each other along a two-dimensional plane, so that it may be folded in the tight confines of an automobile's interior. In several embodiments, one or more arms are collapsible arms that facilitate the folding of the sheet. The collapsible arms are comprised of two sections connected by a bi-stable hinge, or comprised of spring-loaded telescoping sections. In another embodiment, the flexible sheet is of a wide rectangular shape supported by radial arms hinged to separate hubs positioned on left and right sections of the sheet. In yet another embodiment, the arms are all rigid, and the sheet includes a slit extending from its center to an edge. The slit is separable for enabling the folding of the arms and sheet.

26 Claims, 7 Drawing Sheets

COLLAPSIBLE SUNSHADE WITH HINGED ARMS

BACKGROUND OF THE INVENTION

1. Field of the Invention

This invention relates generally to sunshades for automobiles.

2. Prior Art

Some popular automobile windshield or window sunshades include folding cardboard panels, and fabric-spanned spring loops. Other sunshades are also known. U.S. Pat. No. 4,606,572 to Maguire shows a sunshade comprised of a pair of fans, each with a plurality of blades hinged about a common pivot. The large number of interconnected rigid blades are relatively expensive to manufacture and assemble. Another sunshade is sold by Quantum Auto, Inc. of Los Angeles, Calif., under the trademark "BRELLA-SHADE." It is comprised of a flexible sheet supported by four radial arms hinged about axes parallel to the sheet. The arms fold and unfold through three dimensional space like an umbrella, so that it is cumbersome to use in the tight confines of an automobile.

OBJECTS OF THE INVENTION

Accordingly, objects of the present collapsible sunshade with hinged arms are: to cover a windshield or window of an automobile for shading its interior; to be easily foldable within the tight confines of an automobile's interior; and to be simple and economical to manufacture.

Further objects of the present invention will become apparent from a consideration of the drawings and ensuing description.

BRIEF SUMMARY OF THE INVENTION

A sunshade includes a flexible sheet with a hub generally positioned at its center. A plurality of radial arms are hinged to the hub about parallel axes which are perpendicular to the sheet. The outer ends of the arms are secured to the corners of the sheet. The sunshade is folded by pivoting the arms toward each other along a two-dimensional plane, so that it may be folded in the tight confines of an automobile's interior. In several embodiments, one or more arms are collapsible arms that facilitate the folding of the sheet. The collapsible arms are comprised of two sections connected by a bi-stable hinge, or comprised of spring-loaded telescoping sections. In another embodiment, the flexible sheet is of a wide rectangular shape supported by radial arms hinged to separate hubs positioned on left and right sections of the sheet. In yet another embodiment, the arms are all rigid, and the sheet includes a slit extending from its center to an edge. The slit is separable for enabling the folding of the arms and sheet.

DETAILED DESCRIPTION OF THE INVENTION

Figure 1:
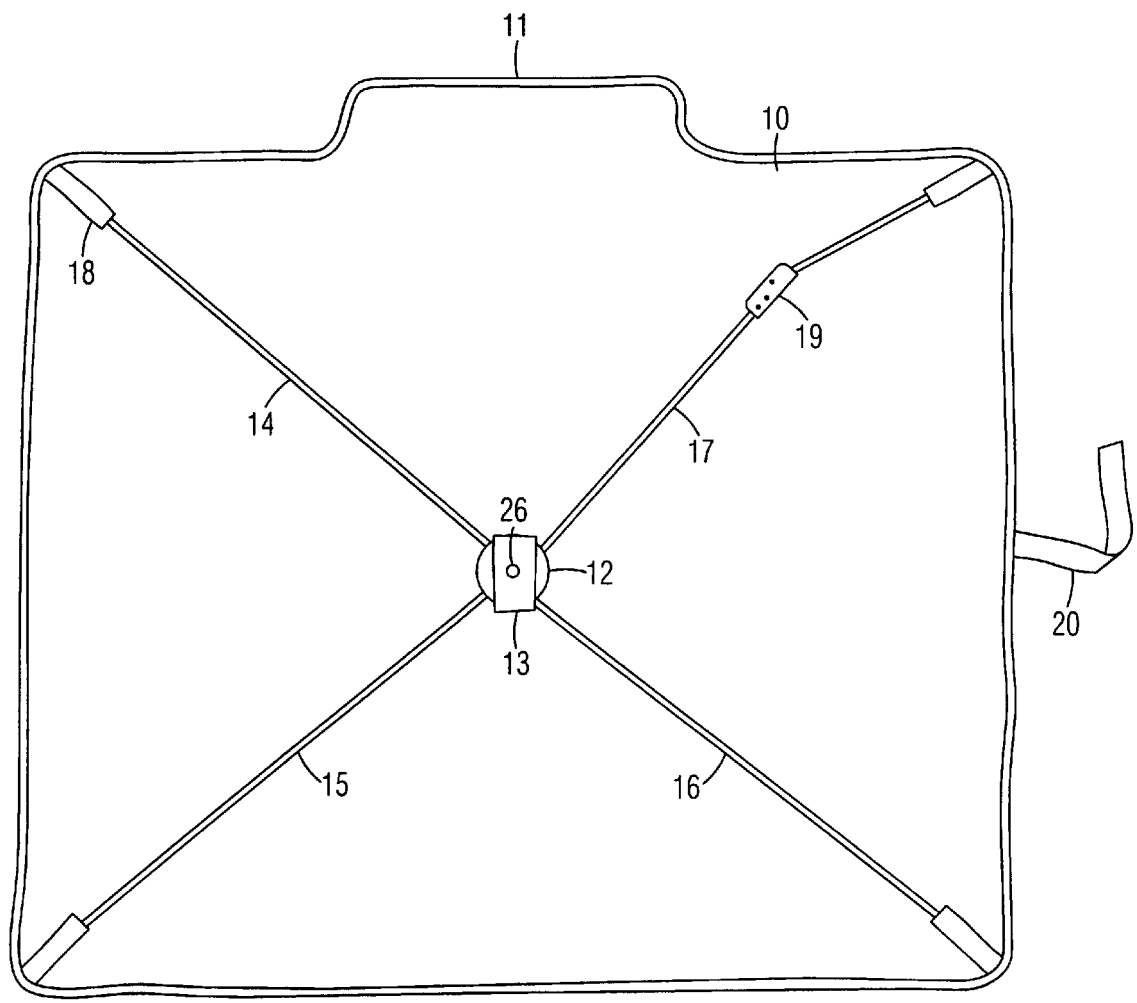
FIG. 1 is a rear view of the present collapsible sunshade with hinged arms in an open condition.

FIG. 1:

A first embodiment of the sunshade is shown in a rear view in FIG. 1. It includes a flexible sheet 10, which may be comprised of any flexible material that is preferably at least partially opaque or at least partially reflective, or both. A tab 11 is arranged along one edge of sheet 10, so that if the sunshade is used for covering a side window, tab 11 is gripped between the top of the window glass and the window frame for securing the sunshade in position. A hub 12 is positioned generally at a center of sheet 10, and is preferably secured thereto by a strap 13 and a pin 26. Radial arms 14–17 are hinged together at hub 12. The distal ends of arms 14–17 are secured to the corners of sheet 10 in pockets 18. Arm 17 is a collapsible arm which includes two sections connected by a bi-stable hinge 19. Arm 17 is kept in an extended position by the tension of sheet 10 along the direction between the hinge and tip of arm 17, so in turn sheet 10 is kept in a fully opened condition. A strap 20, which is preferably a hook-and-loop fastener strap, is attached to an edge of sheet 10. The sunshade may be positioned against a windshield, a side window, or a rear window of an automobile for shading its interior. When positioned against a windshield, the sunshade is held in position by pivoting the automobile's visors against it.

Figure 2:
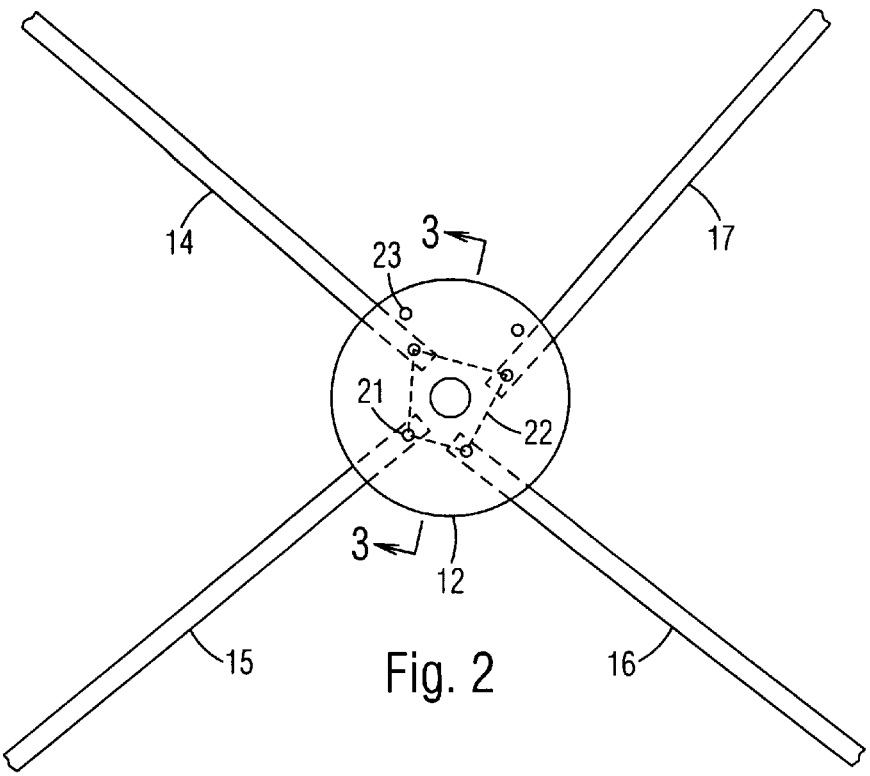
FIG. 2 is an enlarged rear view of a hub of the sunshade in an open condition.

FIG. 2:

Hub 12 is shown enlarged in FIG. 2 in an open condition. Arms 14–17 are hinged to hub 12 by pivots 21 arranged in a trapezoidal pattern 22. Pivots 21 are parallel to each other, and perpendicular to sheet 10 (FIG. 1). Stops 23 positioned adjacent arms 14 and 17 limit their range of movement in the open position. Strap 13 (FIG. 1) is not shown for clarity.

Figure 3:
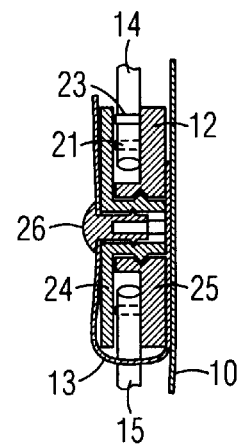
FIG. 3 is a side sectional view of the hub, taken along line 3—3 in FIG. 2.

FIG. 3:

Hub 12 is shown in a side sectional view in FIG. 3. It is comprised of a pair of discs 24 and 25 locked together. Strap 13 is U-shaped, with one side attached to sheet 10, and another side wrapped around the outside of hub 12 and secured thereto by a pin 26.

Figure 4:
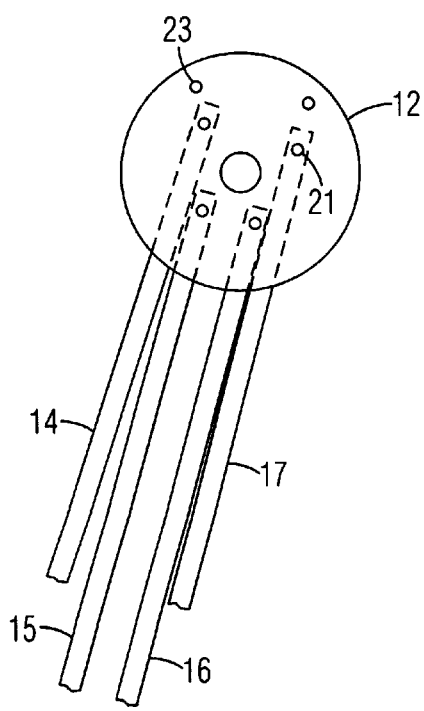
FIG. 4 is a rear view of the hub in a closed condition.

FIG. 4:

Arms 14–17 are shown in a folded condition in FIG. 4. They are folded together toward a direction away from stops 23. The trapezoidal arrangement of pivots 21 enables arms 14–17 to be folded parallel to and adjacent each other.

Figure 5:
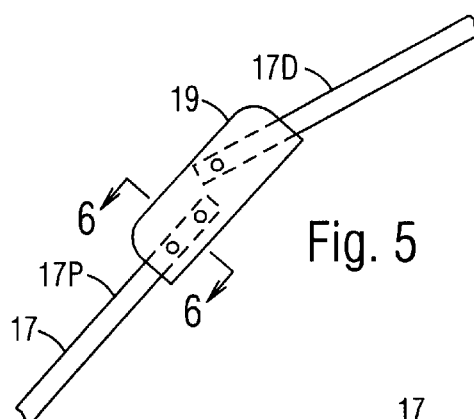
FIG. 5 is an enlarged rear view of a bi-stable hinge on one of the arms.
Figure 6:
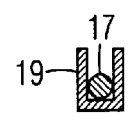
FIG. 6 is a side sectional view of the bi-stable hinge, taken along line 6—6 in FIG. 5.

FIGS. 5–6:

Bi-stable hinge 19 is shown enlarged in a rear view in FIG. 5 and a sectional view in FIG. 6. It is comprised of a U-shaped bracket. A proximal section 17P of arm 17 is fixedly attached within hinge 19, and a distal section 17D of arm 17 is hinged within hinge 19. The pivot for the distal section is offset outwardly relative to the axis of the proximal section, so that the distal section is pivoted through slightly more than 180 degrees relative to the proximal section when arm 17 is fully extended.

Figure 7:
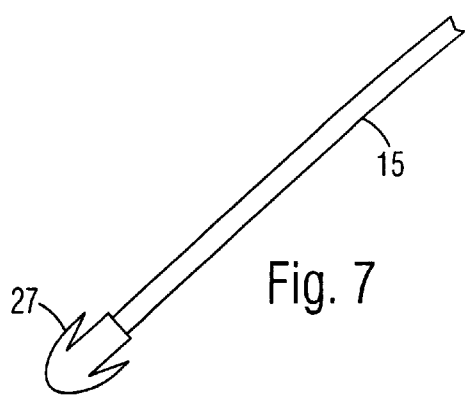
FIG. 7 is a rear view of a tip of one of the arms.

FIG. 7:

A distal end of arm 15 is shown in FIG. 7. A hooked head 27 is attached to the tip of arm 15 for preventing it from slipping out of pocket 18 (FIG. 1). Other arms are provided with similar hooked heads.

Figure 8:
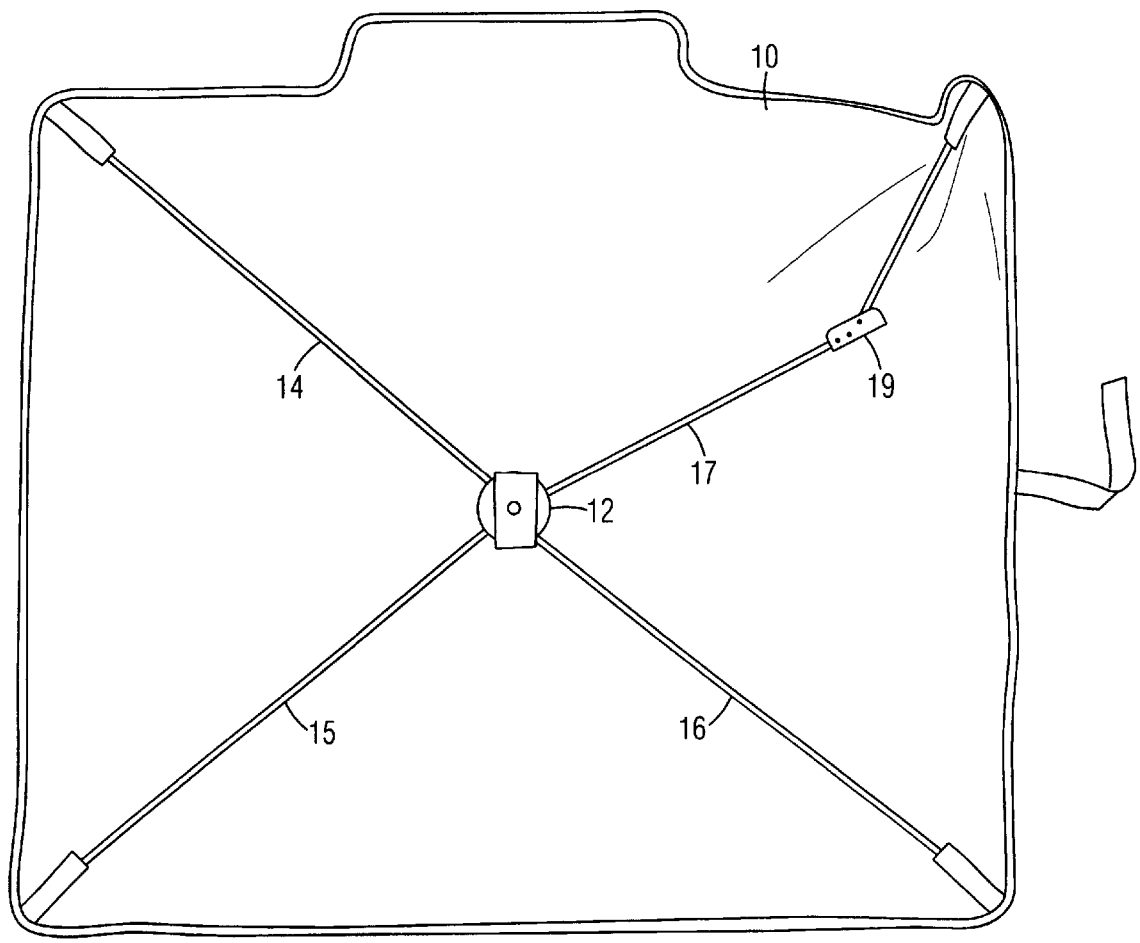
FIG. 8 is a first step in the folding of the sunshade.

FIGS. 8–10:

The sunshade of FIG. 1 is shown in a first step of being folded in FIG. 8. The distal section of collapsible arm 17 is pivoted about bi-stable hinge 19 away from the extended position. The corresponding corner of sheet 10 is thus slackened.

Figure 9:
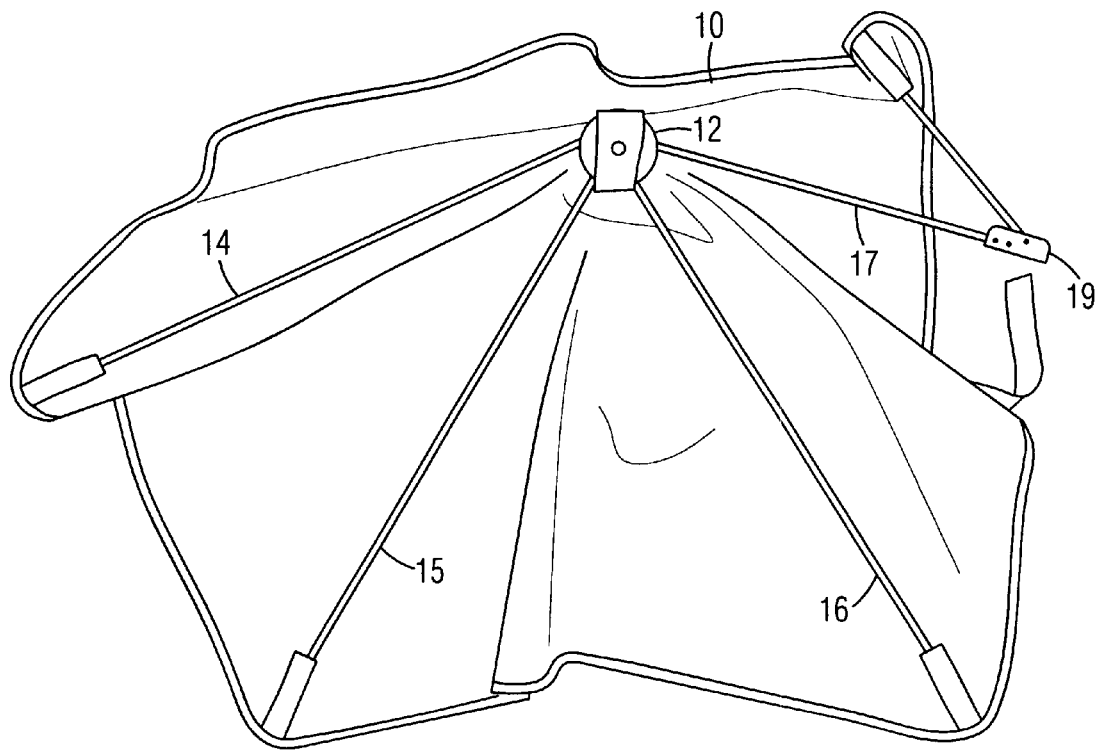
FIG. 9 is a second step in the folding of the sunshade.

The sunshade is shown in a second step of being collapsed in FIG. 9. Collapsible arm 17 is continued to be collapsed to reduce the distance between its opposite ends. Sheet 10 is further slackened and collapsed by folding arms 14–17 toward each other.

Figure 10:
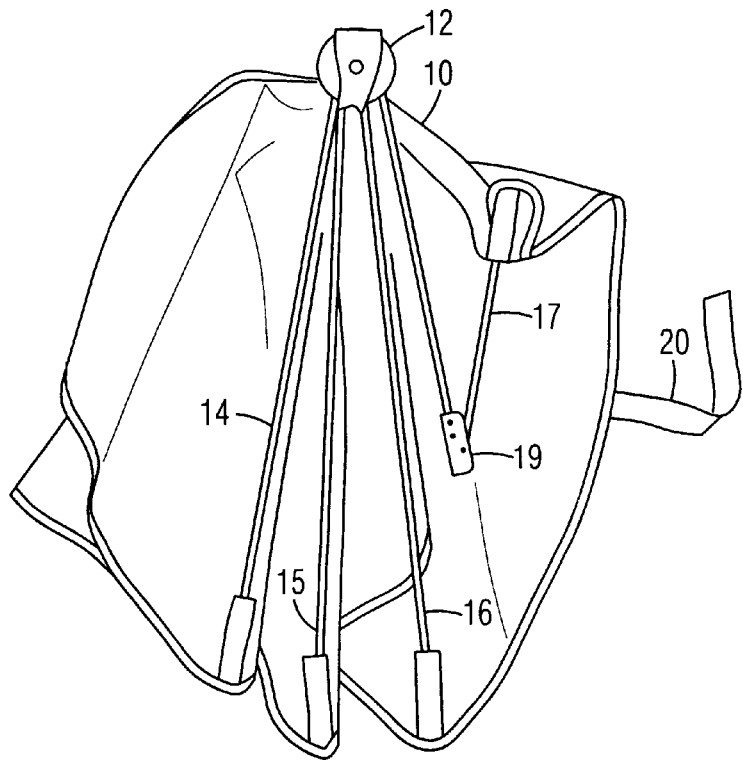
FIG. 10 is a third step in the folding of the sunshade.

The sunshade is shown almost fully collapsed in FIG. 10. Arms 14–17 are almost parallel to each other, and the sections of arm 17 are almost folded parallel to each other. In the condition shown, it is compact enough for convenient everyday use. However, if desired, it can be further compacted by wrapping and securing strap 20 around it.

Figure 11:
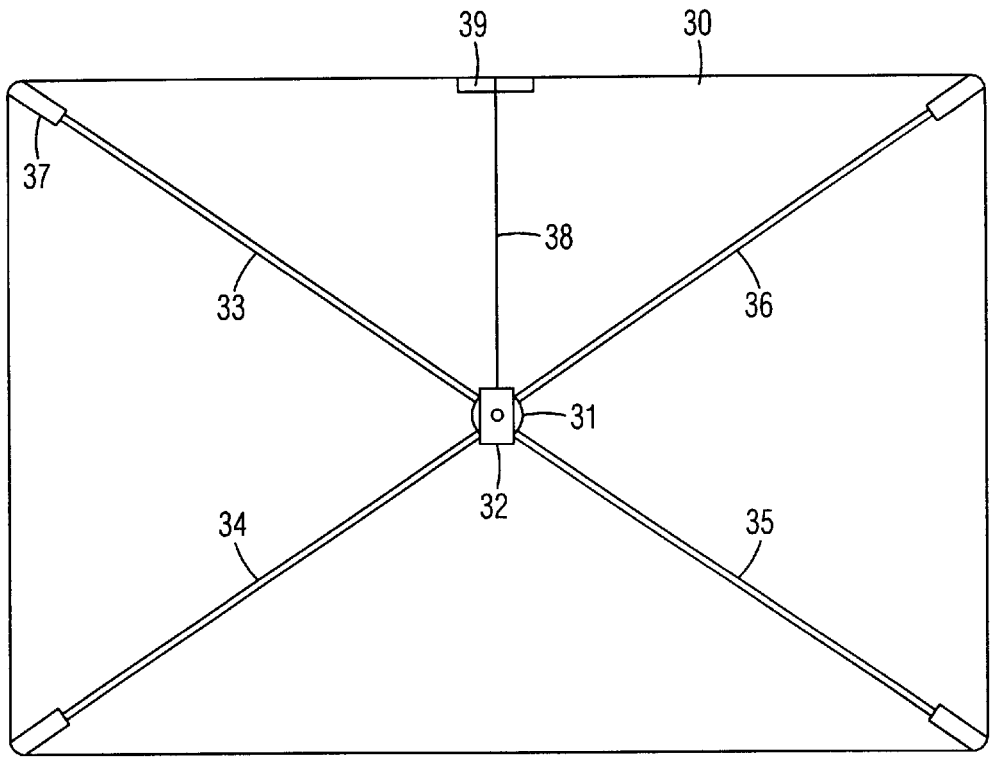
FIG. 11 is a rear view of a second embodiment of the sunshade.

FIG. 11:

A second embodiment of the sunshade is shown in FIG. 11. It includes a flexible sheet 30. A hub 31 is positioned generally at a center of sheet 30, and is preferably secured thereto by a strap 32. Radial arms 33–36 are hinged together at hub 31 in the manner shown in FIG. 2. The distal ends of arms 33–36 are secured to the corners of sheet 30 in pockets 37. Sheet 30 includes a slit 38 extending from its center to one edge. Slit 38 is releasably held together with a fastener 39, which is preferably a hook-and-loop fastener. For fastening opposite edges of slit 38, sheet 30 may overlap at slit 38, or fastener 39 may be a tab which extends slightly from one edge of slit 38. The sunshade is folded by releasing fastener 39, separating slit 38, and pivoting arms 33–36 together in the direction opposite slit 38.

Figure 12:
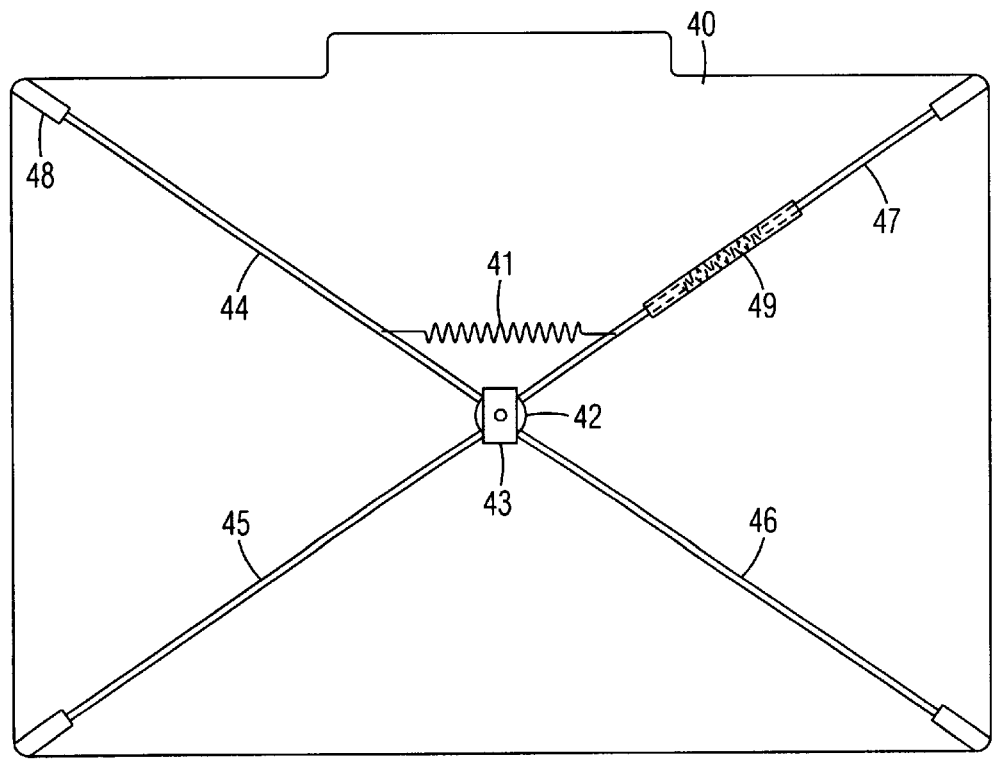
FIG. 12 is a rear view of a third embodiment of the sunshade.

FIG. 12:

A third embodiment of the sunshade is shown in FIG. 12. It includes a flexible sheet 40. A hub 42 is positioned generally at a center of sheet 40, and is preferably secured thereto by a strap 43. Radial arms 44–47 are hinged together at hub 42 in the manner shown in FIG. 2. The distal ends of arms 44–47 are secured to the corners of sheet 40 in pockets 48. Arm 47 is a collapsible arm which includes a proximal section and a distal section telescopically connected together. Collapsible arm 47 is biased to an extended position by a spring 49, which is preferably a compression spring, to keep sheet 40 in an open condition. An spring 41, which is preferably an extension spring, is optionally connected between arms 44 and 47 to bias them to the fully opened position shown. The sunshade is collapsed by folding arms 44–47 downwardly while compressing arm 47.

Figure 13:
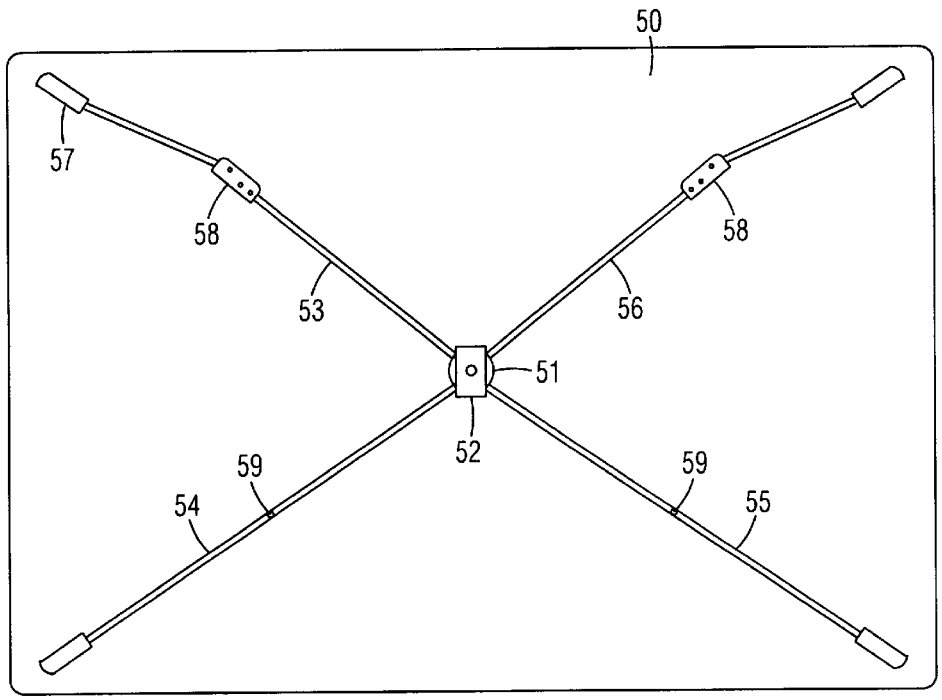
FIG. 13 is a rear view of a fourth embodiment of the sunshade.

FIG. 13:

A fourth embodiment of the sunshade is shown in FIG. 13. It includes a flexible sheet 50. A hub is positioned generally at a center of sheet 50, and is preferably secured thereto by a strap 52. Radial arms 53–56 are hinged together at hub 51 in the manner shown in FIG. 2. The distal ends of arms 53–56 are secured to or near the corners of sheet 50 in pockets 57. Arms 53 and 56 are collapsible arms, each of which includes two sections connected by a bi-stable hinge 58. Arms 54 and 55 each include a hinge 59 at an intermediate position. It is folded in a similar manner as the first embodiment in FIG. 1, except arms 53 and 56 are both collapsed.

Figure 14:
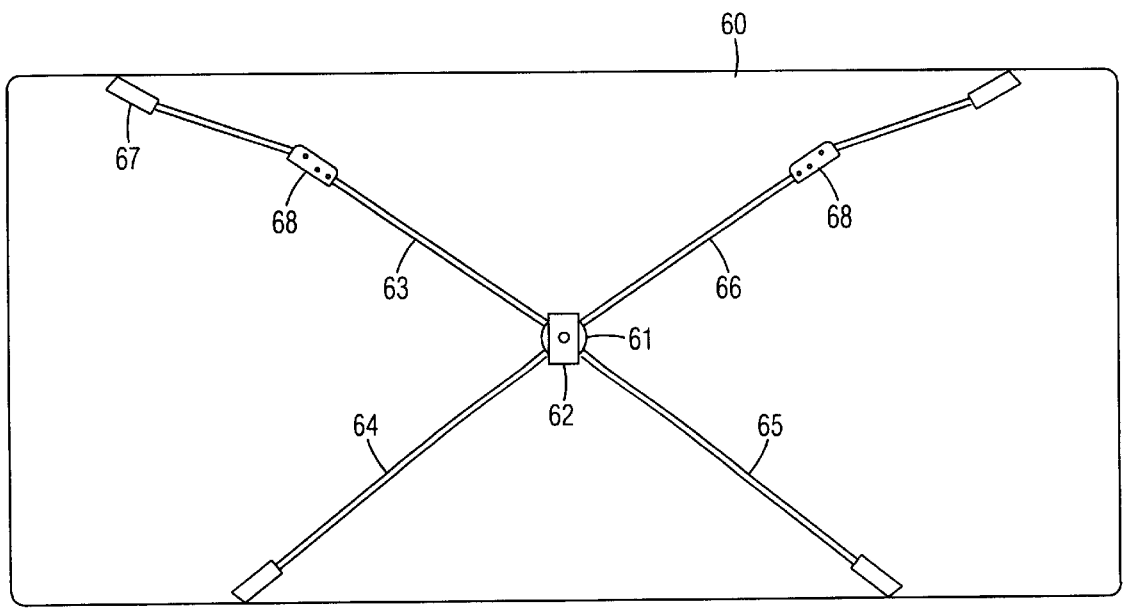
FIG. 14 is a rear view of a fifth embodiment of the sunshade.

FIG. 14:

A fifth embodiment of the sunshade is shown in FIG. 14. It includes a flexible sheet 60 wide enough for covering an entire automobile windshield. A hub 61 is positioned generally at a center of sheet 60, and is preferably secured thereto by a strap 62. Radial arms 63–66 are hinged together at hub 61 in the manner shown in FIG. 2. The distal ends of arms 63–66 are secured to the upper and lower edges of sheet 60 in pockets 67 which are positioned inwardly from the corners thereof. Alternatively, one or more of the distal ends can be secured a short distance from the upper and lower edges of sheet 60. Arms 63 and 66 are longer, collapsible arms, each of which includes two sections connected by a bi-stable hinge 68. Arms 64 and 65 are shorter arms of fixed length. It is folded in a similar manner as the first embodiment in FIG. 1, except arms 63 and 66 are both collapsed.

Figure 15:
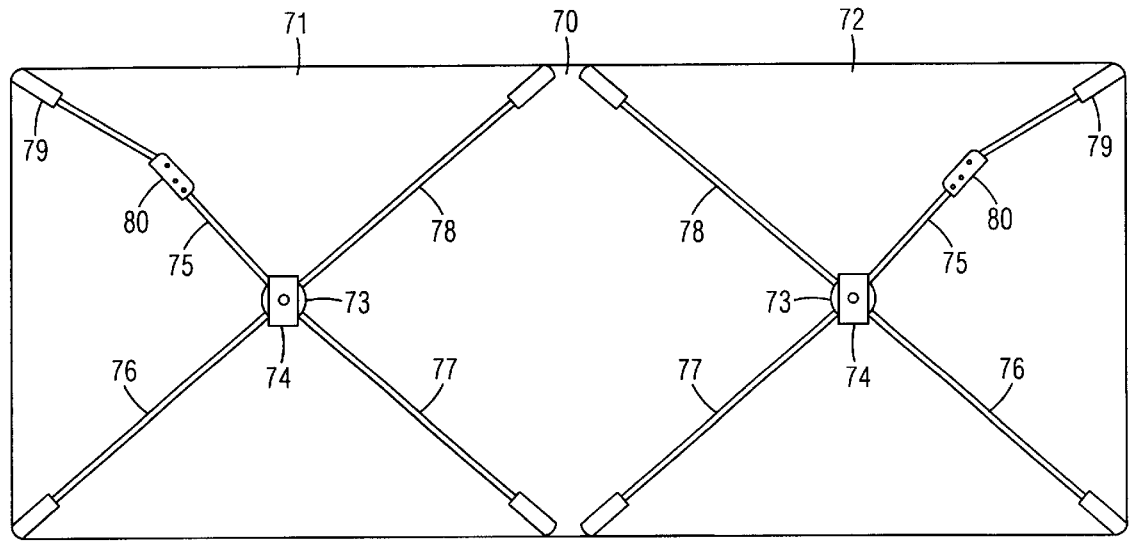
FIG. 15 is a rear view of a sixth embodiment of the sunshade.

FIG. 15:

A sixth embodiment of the sunshade is shown in FIG. 15. It includes a flexible sheet 70 wide enough for covering an entire automobile windshield. Sheet 70 includes left and right sections 71 and 72, each of which has a hub 73 positioned generally at a center thereof, and preferably secured thereto by a strap 74. Radial arms 75–78 are hinged together at hub 73 in the manner shown in FIG. 2. The distal ends of arms 75–78 are secured to or near the corners of a corresponding section of sheet 70 in pockets 79. Arm 75 is a collapsible arm which includes two sections connected by a bi-stable hinge 80.

Figure 16:
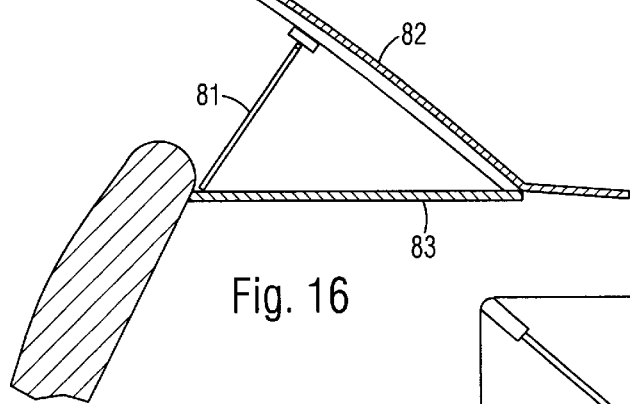
FIG. 16 is a side view of a seventh embodiment of the sunshade.

FIG. 16:

A seventh embodiment of the sunshade is shown in FIG. 16. It may be similar to any of the other embodiments, but further includes a supporting rod 81 extending from the hub. It is for being positioned under a rear window 82 of a vehicle by positioning the lower end of rod 81 against a horizontal panel 83 at the bottom of window 82.

Figure 17:
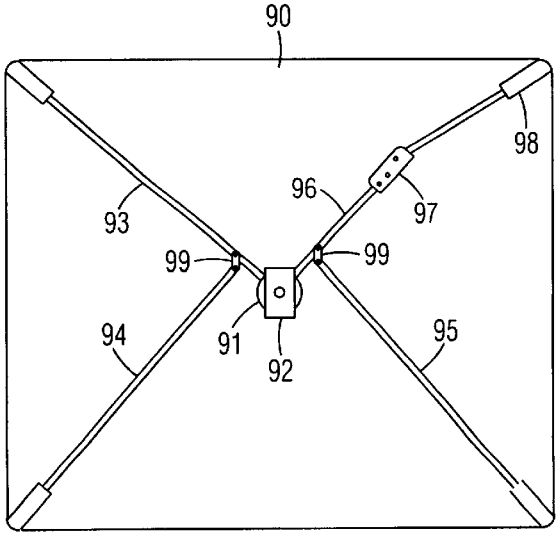
FIG. 17 is a rear view of an eighth embodiment of the sunshade.

FIG. 17:

An eighth embodiment of the sunshade is shown in a rear view in FIG. 17. It includes a flexible sheet 90. A hub 91 is positioned generally at a center of sheet 90, and is preferably secured thereto by a strap 92. The proximal ends of radial arms 93 and 96 are hinged to hub 91, and the proximal ends of arms 94 and 95 are respectively hinged to the proximal portions of arms 93 and 96 by brackets 99. The distal ends of arms 93–96 are secured to the corners of sheet 90 in pockets 98. Arm 96 is a collapsible arm which includes two sections connected by a bi-stable hinge 97. The folding and unfolding procedures of this embodiment of the sunshade is identical to that of the first embodiment shown in FIGS. 1–10.

SUMMARY AND SCOPE

Accordingly, a collapsible sunshade with hinged arms is provided. It covers a windshield or window of an automobile for shading its interior. It is easily foldable within the tight confines of an automobile's interior. It is also simple and economical to manufacture.

Although the above description is specific, it should not be considered as a limitation on the scope of the invention, but only as an example of the preferred embodiment. Many variations are possible within the teachings of the invention. For example, the hub may be attached to the flexible sheet by a pin instead of a strap, or it may be unattached to the sheet. Instead of different axes, the arms may be hinged to the same axis. Other types of bi-stable hinges may be used. Other types of collapsible arms may be used. In the absence of the hub, the supporting rod for propping up the sunshade against a rear window may be connected directly to the arms. Instead of collapsible arms, slits may be provided on the rectangular sheet of FIG. 15. The flexible sheet may be of any shape. Therefore, the scope of the invention should be determined by the appended claims and their legal equivalents, not by the examples given.

What is claimed is:

1. A collapsible sunshade, comprising:

a sheet which is generally planar when expanded;

a hub positioned at an interior portion of said sheet; and a plurality of arms pivoted to said hub and radiating outwardly from said hub, distal ends of said arms connected to said sheet and supporting said sheet in an expanded position when said arms are spread apart;

said sheet being generally continuous and inseparable;

said arms being pivoted to said hub about respective axes generally perpendicular to said sheet, thereby said arms are moved generally along a two-dimensional flat plane during collapsing for operation in limited space;

at least one of said arms comprises a collapsible arm with opposite ends reducible in distance to slacken said sheet and initiate collapse of said sheet.

2. The collapsible sunshade of claim 1, wherein said axes of said arms are generally arranged in a quadrilateral pattern with a narrower side opposite a wider side, so that when said arms are fully folded, said arms are in generally parallel positions toward said narrower side of said quadrilateral pattern.

3. The collapsible sunshade of claim 1, wherein said axes of said arms are generally arranged in a quadrilateral pattern with a narrower side opposite a wider side, so that when said arms are fully folded, said arms are in generally parallel positions toward said narrower side of said quadrilateral pattern, said hub further including a pair of stops adjacent said wider side of said quadrilateral pattern, said stops defining respective opening limits of two of said arms.

4. The collapsible sunshade of claim 1, further including a plurality of pockets on said sheet, and a retainer on said distal end of said collapsible arm secured inside a corresponding one of said pockets.

5. The collapsible sunshade of claim 1, further including a plurality of pockets on said sheet, and a hooked head on said distal end of said collapsible arm secured inside one of said pockets.

6. A collapsible sunshade, comprising:

a sheet which is generally planar when expanded;

a hub positioned at an interior portion of said sheet; and a plurality of arms pivoted to said hub and radiating outwardly from said hub, distal ends of said arms connected to said sheet and supporting said sheet in an expanded position when said arms are spread apart;

said sheet being generally continuous and inseparable;

said arms being pivoted to said hub about respective axes generally perpendicular to said sheet, thereby said arms are moved generally along a two-dimensional flat plane during collapsing for operation in limited space;

at least one of said arms comprising a collapsible arm with opposite ends reducible in distance to slacken said sheet and initiate collapse of said sheet, said collapsible arm comprising a pair of sections hinged together about a collapsing axis generally perpendicular to said sheet, said sections of said collapsible arm are moved relative to each other along said two-dimensional flat plane during collapsing.

7. The collapsible sunshade of claim 6, wherein said sections of said collapsible arm are hinged together with a bi-stable hinge.

8. The collapsible sunshade of claim 6, wherein said axes of said arms are generally arranged in a quadrilateral pattern with a narrower side opposite a wider side, so that when said arms are fully folded, said arms are in generally parallel positions toward said narrower side of said quadrilateral pattern.

9. The collapsible sunshade of claim 6, wherein said axes of said arms are generally arranged in a quadrilateral pattern with a narrower side opposite a wider side, so that when said arms are fully folded, said arms are in generally parallel positions toward said narrower side of said quadrilateral pattern, said hub further including a pair of stops adjacent said wider side of said quadrilateral pattern, said stops defining respective opening limits of two of said arms.

10. The collapsible sunshade of claim 6, further including a plurality of pockets on said sheet, and a retainer on said distal end of said collapsible arm secured inside a corresponding one of said pockets.

11. The collapsible sunshade of claim 6, further including a plurality of pockets on said sheet, and a hooked head on said distal end of said collapsible arm secured inside one of said pockets.

12. A collapsible sunshade for being installed inside a vehicle, comprising:

a hub;

a plurality of arms pivoted to said hub and radiating outwardly from said hub; and a collapsible sheet which is generally planar when expanded, wherein said arms support said sheet in an expanded position when said arms are spread apart, and wherein said hub is positioned generally at an inside portion of said sheet;

wherein during expansion and during collapse of said sheet, said arms are moved along a twodimensional plane of said sheet;

wherein at least one of said arms comprises a collapsible arm with opposite ends reducible in distance to slacken said sheet and initiate collapse of said sheet;

wherein said collapsible arm comprises a plurality of sections which move relative to each other during collapse and during expansion of said collapsible arm, so that all of said sections of said collapsible arm remain generally parallel to said plane of said sheet during collapse and during expansion of said collapsible arm inside said vehicle.

13. The collapsible sunshade of claim 12, wherein said sections of said collapsible arm are hinged together with a bi-stable hinge.

14. The collapsible sunshade of claim 12, wherein each of said arms pivot around its own axis attached to said hub, so that all of said arms pivot along said plane of said sheet, and when said collapsible sunshade is expanded, each of said arms is generally straight, and all of said arms point in different directions, with no two of said arms pointing in an identical direction.

15. A collapsible sunshade for being installed inside a vehicle, comprising:

a hub;

a plurality of arms pivoted to said hub and radiating outwardly from said hub; and a collapsible sheet which is generally planar when expanded, wherein said arms support said sheet in an expanded position when said arms are spread apart, and wherein said hub is positioned generally at an inside portion of said sheet;

wherein during expansion and during collapse of said sheet, said arms are pivoted generally parallel to a two-dimensional plane of said sheet;

wherein at least one of said arms comprises a collapsible arm with opposite ends reducible in distance to slacken said sheet and initiate collapse of said sheet;

wherein when said collapsible arm is in an expanded position, said sheet is expanded and prevents said arms from being pivoted toward a collapsed position, so that said collapsible arm must be collapsed to collapse said sheet.

16. The collapsible sunshade of claim 15, further including a pair of stops on said hub defining respective opening limits of two of said arms.

17. The collapsible sunshade of claim 15, wherein said sheet has a continuous convex circumference which is inseparable between said arms when said sheet is expanded.

18. The collapsible sunshade of claim 15, wherein said sheet has a continuous, generally rectangular circumference which is inseparable between said arms when said sheet is expanded.

19. The collapsible sunshade of claim 15, wherein all of said arms extend in different directions when said sheet is expanded, with no two of said arms pointing in an identical direction.

20. The collapsible sunshade of claim 15, wherein all of said arms extend along an inside portion of said sheet, and none of said arms extend along an edge of said sheet.

21. The collapsible sunshade of claim 15, further including a rod connected to proximal ends of said arms, said rod extending away from said sheet and supporting said sheet at an angle relative to a supporting surface.

22. The collapsible sunshade of claim 15, wherein said sheet is comprised of a rectangular sheet having left and right portions, said hub including left and right hub members, said arms being comprised of left and right sets of arms respectively pivoted to said lift and right hub members and respectively supporting said left and right portions of said sheet.

23. The collapsible sunshade of claim 15, wherein said collapsible arm is comprised of a plurality of sections telescopically connected together.

24. The collapsible sunshade of claim 15, wherein said collapsible arm is comprised of a plurality of sections telescopically connected together and biased by a spring to an extended position.

25. A method for installing a collapsible sunshade inside a vehicle, the method comprising:

providing a sunshade having a plurality of arms pivotally mounted on a hub and radiating outwardly from said hub;

pivoting said plurality of arms of said sunshade away from each other inside said vehicle, so that all of said arms remain generally parallel to a two-dimensional plane, at least one of said arms comprising a collapsible arm comprising a plurality of sections; and expanding said collapsible arm inside said vehicle by moving said collapsible arm generally along said two-dimensional plane so that all of said sections thereof remain generally parallel to said two-dimensional plane, thereby expanding a sheet attached to said arms through a limited space inside said vehicle.

26. A method for installing a collapsible sunshade inside a vehicle, the method comprising:

providing a sunshade having a plurality of arms pivotally mounted on a hub and radiating outwardly from said hub;

pivoting said plurality of arms of said sunshade away from each other inside said vehicle, so that all of said arms remain generally parallel to a two-dimensional plane, at least one of said arms comprising a collapsible arm comprising a plurality of sections connected by a bi-stable hinge; and expanding said collapsible arm inside said vehicle by moving said collapsible arm generally along said two-dimensional plane so that all of said sections thereof remain generally parallel to said two-dimensional plane, thereby expanding a sheet attached to said arms through a limited space inside said vehicle.

* * * * *